(12) United States Patent
Floyd

(10) Patent No.: US 7,660,031 B2
(45) Date of Patent: Feb. 9, 2010

(54) DEVICE AND METHOD FOR MODIFYING ACTUATION VOLTAGE THRESHOLDS OF A DEFORMABLE MEMBRANE IN AN INTERFEROMETRIC MODULATOR

(75) Inventor: Philip D. Floyd, Redwood City, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 12/027,862

(22) Filed: Feb. 7, 2008

(65) Prior Publication Data

US 2008/0144163 A1 Jun. 19, 2008

Related U.S. Application Data

(62) Division of application No. 11/197,885, filed on Aug. 5, 2005, now Pat. No. 7,369,296.

(60) Provisional application No. 60/613,451, filed on Sep. 27, 2004.

(51) Int. Cl.
*G02B 26/00* (2006.01)

(52) U.S. Cl. ........................ 359/291; 359/290

(58) Field of Classification Search ........... 359/223, 359/224, 290, 291
See application file for complete search history.

(56) References Cited

U.S. PATENT DOCUMENTS 3,616,312 A 10/1971 McGriff et al.
3,656,836 A 4/1972 de Cremoux et al.

(Continued)

FOREIGN PATENT DOCUMENTS

CH 680534 9/1992

(Continued)

OTHER PUBLICATIONS

Official Action dated Aug. 7, 2008 in European App. No. 05792735.2.

(Continued)

*Primary Examiner*—Timothy J Thompson
(74) *Attorney, Agent, or Firm*—Knobbe, Martens, Olson & Bear, LLP

(57) ABSTRACT

By varying the spacing between a partially-reflective, partially-transmissive surface and a highly reflective surface positioned behind the partially-reflective, partially-transmissive surface, an interferometric modulator selectively creates constructive and/or destructive interference between light waves reflecting off the two surfaces. The spacing can be varied by applying a voltage to create electrostatic attraction between the two surfaces, which causes one or both surfaces to deform and move closer together. In the absence of such attraction, the surfaces are in a relaxed position, where they are farther apart from one another. A actuation voltage is needed to create sufficient electrostatic attraction to cause a surface to deform. The actuation voltage can be modified by implanting ions in a dielectric layer attached to one or both surfaces. Upon the application of a voltage, the ions create a baseline level of repulsion or attraction between the two surfaces, which thus require more or less voltage, respectively, to cause a surface to deform. The degree of ion implantation can be chosen to set the actuation voltage as desired, or the surfaces can be made to deform at a given voltage by appropriately selecting the degree of ion implantation.

15 Claims, 11 Drawing Sheets

U.S. PATENT DOCUMENTS

| | | |
|---|---|---|
| 3,728,030 A | 4/1973 | Hawes |
| 3,955,880 A | 5/1976 | Lierke |
| 4,377,324 A | 3/1983 | Durand et al. |
| 4,403,248 A | 9/1983 | te Velde |
| 4,459,182 A | 7/1984 | te Velde |
| 4,482,213 A | 11/1984 | Piliavin et al. |
| 4,519,676 A | 5/1985 | te Velde |
| 4,786,128 A | 11/1988 | Birnbach |
| 4,790,635 A | 12/1988 | Apsley |
| 4,863,245 A | 9/1989 | Roxlo |
| 4,900,136 A | 2/1990 | Goldburt et al. |
| 4,965,562 A | 10/1990 | Verhulst |
| 5,022,745 A | 6/1991 | Zahowski et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,099,353 A | 3/1992 | Hornbeck |
| 5,124,834 A | 6/1992 | Cusano et al. |
| 5,142,405 A | 8/1992 | Hornbeck |
| 5,168,406 A | 12/1992 | Nelson |
| 5,172,262 A | 12/1992 | Hornbeck |
| 5,192,395 A | 3/1993 | Boysel et al. |
| 5,212,582 A | 5/1993 | Nelson |
| 5,218,472 A | 6/1993 | Jozefowicz et al. |
| 5,226,099 A | 7/1993 | Mignardi et al. |
| 5,231,532 A | 7/1993 | Magel et al. |
| 5,293,272 A | 3/1994 | Jannson et al. |
| 5,311,360 A | 5/1994 | Bloom et al. |
| 5,312,512 A | 5/1994 | Allman et al. |
| 5,345,328 A | 9/1994 | Fritz et al. |
| 5,347,377 A | 9/1994 | Revelli, Jr. et al. |
| 5,381,232 A | 1/1995 | van Wijk |
| 5,474,865 A | 12/1995 | Vasudev |
| 5,488,505 A | 1/1996 | Engle |
| 5,489,952 A | 2/1996 | Gove et al. |
| 5,500,761 A | 3/1996 | Goossen et al. |
| 5,526,688 A | 6/1996 | Boysel et al. |
| 5,535,047 A | 7/1996 | Hornbeck |
| 5,552,924 A | 9/1996 | Tregilgas |
| 5,559,358 A | 9/1996 | Burns et al. |
| 5,578,976 A | 11/1996 | Yao |
| 5,597,736 A | 1/1997 | Sampsell |
| 5,602,671 A | 2/1997 | Hornbeck |
| 5,608,468 A | 3/1997 | Gove et al. |
| 5,619,059 A | 4/1997 | Li et al. |
| 5,619,365 A | 4/1997 | Rhoades et al. |
| 5,619,366 A | 4/1997 | Rhoades et al. |
| 5,629,790 A | 5/1997 | Neukermans et al. |
| 5,638,946 A | 6/1997 | Zavracky |
| 5,665,997 A | 9/1997 | Weaver et al. |
| 5,674,757 A | 10/1997 | Kim |
| 5,710,656 A | 1/1998 | Goossen |
| 5,737,050 A | 4/1998 | Takahara et al. |
| 5,739,945 A | 4/1998 | Tayebati |
| 5,745,281 A | 4/1998 | Yi et al. |
| 5,771,321 A | 6/1998 | Stern |
| 5,784,189 A | 7/1998 | Bozler et al. |
| 5,818,095 A | 10/1998 | Sampsell |
| 5,822,110 A | 10/1998 | Dabbaj |
| 5,822,170 A | 10/1998 | Cabuz et al. |
| 5,824,608 A | 10/1998 | Gotoh et al. |
| 5,825,528 A | 10/1998 | Goossen |
| 5,835,256 A | 11/1998 | Huibers |
| 5,867,302 A | 2/1999 | Fleming et al. |
| 5,896,796 A | 4/1999 | Chih |
| 5,914,803 A | 6/1999 | Hwang et al. |
| 5,920,421 A | 7/1999 | Choi |
| 5,943,155 A | 8/1999 | Goossen |
| 5,943,158 A | 8/1999 | Ford et al. |
| 5,945,980 A | 8/1999 | Moissey et al. |
| 5,959,763 A | 9/1999 | Bozler et al. |
| 5,967,163 A | 10/1999 | Pan et al. |
| 5,972,193 A | 10/1999 | Chou et al. |
| 5,976,902 A | 11/1999 | Shih |
| 5,978,127 A | 11/1999 | Berg |
| 5,986,796 A | 11/1999 | Miles |
| 5,994,174 A | 11/1999 | Carey et al. |
| 6,028,690 A | 2/2000 | Carter et al. |
| 6,031,653 A | 2/2000 | Wang |
| 6,040,937 A | 3/2000 | Miles |
| 6,088,162 A | 7/2000 | Someno |
| 6,097,145 A | 8/2000 | Kastalsky et al. |
| 6,097,421 A * | 8/2000 | Takeshita et al. ............ 347/258 |
| 6,099,132 A | 8/2000 | Kaeriyama |
| 6,104,525 A | 8/2000 | Min |
| 6,115,326 A | 9/2000 | Puma et al. |
| 6,137,150 A | 10/2000 | Takeuchi et al. |
| 6,160,833 A | 12/2000 | Floyd et al. |
| 6,170,332 B1 | 1/2001 | MacDonald et al. |
| 6,171,945 B1 | 1/2001 | Mandal et al. |
| 6,194,323 B1 | 2/2001 | Downey et al. |
| 6,201,633 B1 | 3/2001 | Peeters et al. |
| 6,249,039 B1 | 6/2001 | Harvey et al. |
| 6,275,220 B1 | 8/2001 | Nitta |
| 6,282,010 B1 | 8/2001 | Sulzbach et al. |
| 6,288,824 B1 | 9/2001 | Kastalsky et al. |
| 6,295,154 B1 | 9/2001 | Laor et al. |
| 6,323,982 B1 | 11/2001 | Hornbeck |
| 6,324,192 B1 | 11/2001 | Tayebati |
| 6,327,071 B1 | 12/2001 | Kimura et al. |
| 6,333,556 B1 | 12/2001 | Juengling et al. |
| 6,340,435 B1 | 1/2002 | Bjorkman et al. |
| 6,351,329 B1 | 2/2002 | Greywal |
| 6,376,787 B1 | 4/2002 | Martin et al. |
| 6,391,675 B1 | 5/2002 | Ehmke et al. |
| 6,392,781 B1 | 5/2002 | Kim et al. |
| 6,407,851 B1 | 6/2002 | Islam et al. |
| 6,424,094 B1 | 7/2002 | Feldman |
| 6,447,126 B1 | 9/2002 | Hornbeck |
| 6,449,084 B1 | 9/2002 | Guo |
| 6,452,124 B1 | 9/2002 | York et al. |
| 6,452,465 B1 | 9/2002 | Brown et al. |
| 6,466,354 B1 | 10/2002 | Gudeman |
| 6,473,072 B1 | 10/2002 | Comiskey et al. |
| 6,513,911 B1 | 2/2003 | Ozaki et al. |
| 6,522,801 B1 | 2/2003 | Aksyuk et al. |
| 6,537,427 B1 | 3/2003 | Raina et al. |
| 6,549,195 B2 | 4/2003 | Hikida et al. |
| 6,552,840 B2 | 4/2003 | Knipe |
| 6,574,033 B1 | 6/2003 | Chui et al. |
| 6,577,785 B1 | 6/2003 | Spahn et al. |
| 6,597,490 B2 | 7/2003 | Tayebati |
| 6,600,201 B2 | 7/2003 | Hartwell et al. |
| 6,602,791 B2 | 8/2003 | Ouellet et al. |
| 6,608,268 B1 | 8/2003 | Goldsmith |
| 6,624,944 B1 | 9/2003 | Wallace et al. |
| 6,625,047 B2 | 9/2003 | Coleman, Jr. |
| 6,639,724 B2 | 10/2003 | Bower et al. |
| 6,642,913 B1 | 11/2003 | Kimura et al. |
| 6,650,455 B2 | 11/2003 | Miles |
| 6,653,997 B2 | 11/2003 | Van Gorkom et al. |
| 6,660,656 B2 | 12/2003 | Cheung et al. |
| 6,674,562 B1 | 1/2004 | Miles |
| 6,680,792 B2 | 1/2004 | Miles |
| 6,704,475 B2 | 3/2004 | Jin et al. |
| 6,710,908 B2 | 3/2004 | Miles et al. |
| 6,720,267 B1 | 4/2004 | Chen et al. |
| 6,741,377 B2 | 5/2004 | Miles |
| 6,747,785 B2 | 6/2004 | Chen et al. |
| 6,747,800 B1 | 6/2004 | Lin |
| 6,760,146 B2 | 7/2004 | Ikeda et al. |
| 6,778,728 B2 | 8/2004 | Taylor |
| 6,791,441 B2 | 9/2004 | Pillans et al. |

| | | |
|---|---|---|
| 6,794,119 B2 | 9/2004 | Miles |
| 6,803,534 B1 | 10/2004 | Chen et al. |
| 6,809,788 B2 | 10/2004 | Yamada et al. |
| 6,819,469 B1 | 11/2004 | Koba |
| 6,844,959 B2 | 1/2005 | Huibers et al. |
| 6,855,610 B2 | 2/2005 | Tung et al. |
| 6,858,080 B2 | 2/2005 | Linares et al. |
| 6,859,301 B1 | 2/2005 | Islam et al. |
| 6,881,535 B2 | 4/2005 | Yamaguchi |
| 6,882,461 B1 | 4/2005 | Tsai et al. |
| 6,906,847 B2 | 6/2005 | Huibers et al. |
| 6,912,022 B2 | 6/2005 | Lin et al. |
| 6,940,631 B2 | 9/2005 | Ishikawa |
| 6,947,200 B2 | 9/2005 | Huibers |
| 6,952,304 B2 | 10/2005 | Mushika et al. |
| 6,958,847 B2 | 10/2005 | Lin |
| 6,980,350 B2 | 12/2005 | Hung et al. |
| 6,982,820 B2 | 1/2006 | Tsai |
| 6,987,432 B2 | 1/2006 | Lutz et al. |
| 6,995,890 B2 | 2/2006 | Lin |
| 6,999,225 B2 | 2/2006 | Lin |
| 6,999,236 B2 | 2/2006 | Lin |
| 7,006,272 B2 | 2/2006 | Tsai |
| 7,016,095 B2 | 3/2006 | Lin |
| 7,016,099 B2 | 3/2006 | Ikeda et al. |
| 7,027,202 B1 | 4/2006 | Hunter et al. |
| 7,041,571 B2 | 5/2006 | Strane |
| 7,042,619 B1 | 5/2006 | McGinley et al. |
| 7,042,643 B2 | 5/2006 | Miles et al. |
| 7,078,293 B2 | 7/2006 | Lin et al. |
| 7,110,158 B2 | 9/2006 | Miles |
| 7,119,945 B2 | 10/2006 | Cummings et al. |
| 7,123,216 B1 | 10/2006 | Miles |
| 7,172,915 B2 | 2/2007 | Lin et al. |
| 7,193,768 B2 | 3/2007 | Lin |
| 7,233,029 B2 | 6/2007 | Mochizuki |
| 7,250,315 B2 | 7/2007 | Miles |
| 7,291,921 B2 | 11/2007 | Lin |
| 7,297,471 B1 | 11/2007 | Miles |
| 7,317,106 B2 * | 1/2008 | Warner et al. ............. 548/335.1 |
| 7,323,217 B2 | 1/2008 | Lin et al. |
| 7,485,236 B2 | 2/2009 | Lin |
| 7,550,794 B2 | 6/2009 | Miles et al. |
| 2001/0003487 A1 | 6/2001 | Miles |
| 2001/0010953 A1 | 8/2001 | Kang et al. |
| 2001/0026951 A1 | 10/2001 | Vergani et al. |
| 2001/0028503 A1 | 10/2001 | Flanders et al. |
| 2001/0055208 A1 | 12/2001 | Kimura |
| 2002/0031155 A1 | 3/2002 | Tayebati et al. |
| 2002/0036304 A1 | 3/2002 | Ehmke et al. |
| 2002/0054422 A1 | 5/2002 | Carr et al. |
| 2002/0055253 A1 | 5/2002 | Rudhard |
| 2002/0058422 A1 | 5/2002 | Jang et al. |
| 2002/0070931 A1 | 6/2002 | Ishikawa |
| 2002/0075555 A1 | 6/2002 | Miles |
| 2002/0109899 A1 | 8/2002 | Ohtaka et al. |
| 2002/0110948 A1 | 8/2002 | Huang et al. |
| 2002/0131682 A1 | 9/2002 | Nasiri et al. |
| 2002/0135857 A1 | 9/2002 | Fitzpatrick et al. |
| 2002/0141690 A1 | 10/2002 | Jin et al. |
| 2002/0146200 A1 | 10/2002 | Kudric et al. |
| 2002/0149850 A1 | 10/2002 | Heffner et al. |
| 2002/0167072 A1 | 11/2002 | Andosca |
| 2002/0168136 A1 | 11/2002 | Atia et al. |
| 2002/0171610 A1 | 11/2002 | Siwinski et al. |
| 2002/0186209 A1 | 12/2002 | Cok |
| 2002/0195681 A1 | 12/2002 | Melendez et al. |
| 2003/0007107 A1 | 1/2003 | Chae |
| 2003/0015936 A1 | 1/2003 | Yoon et al. |
| 2003/0021004 A1 | 1/2003 | Cunningham et al. |
| 2003/0036215 A1 | 2/2003 | Reid |
| 2003/0053078 A1 | 3/2003 | Missey et al. |
| 2003/0072070 A1 | 4/2003 | Miles |
| 2003/0077843 A1 | 4/2003 | Yamauchi et al. |
| 2003/0091072 A1 | 5/2003 | Wang et al. |
| 2003/0102771 A1 | 6/2003 | Akiba et al. |
| 2003/0112096 A1 | 6/2003 | Potter |
| 2003/0118920 A1 | 6/2003 | Johnstone et al. |
| 2003/0119221 A1 | 6/2003 | Cunningham et al. |
| 2003/0123126 A1 | 7/2003 | Meyer et al. |
| 2003/0132822 A1 | 7/2003 | Ko et al. |
| 2003/0138213 A1 | 7/2003 | Jiin et al. |
| 2003/0164350 A1 | 9/2003 | Hanson et al. |
| 2003/0201784 A1 | 10/2003 | Potter |
| 2003/0231373 A1 | 12/2003 | Kowarz et al. |
| 2003/0232373 A1 | 12/2003 | Biswas et al. |
| 2004/0008396 A1 | 1/2004 | Stappaerts |
| 2004/0056742 A1 | 3/2004 | Dabbaj |
| 2004/0058531 A1 | 3/2004 | Miles et al. |
| 2004/0058532 A1 | 3/2004 | Miles et al. |
| 2004/0061543 A1 | 4/2004 | Nam et al. |
| 2004/0070813 A1 | 4/2004 | Aubuchon |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100680 A1 | 5/2004 | Huibers et al. |
| 2004/0124073 A1 | 7/2004 | Pilans et al. |
| 2004/0125281 A1 | 7/2004 | Lin et al. |
| 2004/0125282 A1 | 7/2004 | Lin et al. |
| 2004/0125536 A1 | 7/2004 | Arney et al. |
| 2004/0136045 A1 | 7/2004 | Tran |
| 2004/0136076 A1 | 7/2004 | Tayebati |
| 2004/0150869 A1 | 8/2004 | Kasai |
| 2004/0150939 A1 | 8/2004 | Huff |
| 2004/0174583 A1 | 9/2004 | Chen et al. |
| 2004/0175577 A1 | 9/2004 | Lin et al. |
| 2004/0191937 A1 | 9/2004 | Patel et al. |
| 2004/0201908 A1 | 10/2004 | Kaneko |
| 2004/0207497 A1 | 10/2004 | Hsu et al. |
| 2004/0217919 A1 | 11/2004 | Pichl et al. |
| 2004/0226909 A1 | 11/2004 | Tzeng |
| 2004/0240032 A1 | 12/2004 | Miles |
| 2005/0012577 A1 | 1/2005 | Pillans et al. |
| 2005/0012975 A1 | 1/2005 | George et al. |
| 2005/0024557 A1 | 2/2005 | Lin |
| 2005/0035699 A1 | 2/2005 | Tsai |
| 2005/0046919 A1 | 3/2005 | Taguchi et al. |
| 2005/0046922 A1 | 3/2005 | Lin et al. |
| 2005/0078348 A1 | 4/2005 | Lin |
| 2005/0128565 A1 | 6/2005 | Ljungblad |
| 2005/0249966 A1 | 11/2005 | Tung et al. |
| 2005/0253820 A1 | 11/2005 | Horiuchi |
| 2006/0006138 A1 | 1/2006 | Lin |
| 2006/0024620 A1 | 2/2006 | Nikkel et al. |
| 2006/0050350 A1 | 3/2006 | Rijks et al. |
| 2006/0066932 A1 | 3/2006 | Chui |
| 2006/0077528 A1 | 4/2006 | Floyd |
| 2006/0261330 A1 | 11/2006 | Miles |
| 2007/0121205 A1 | 5/2007 | Miles |
| 2008/0026328 A1 | 1/2008 | Miles |

FOREIGN PATENT DOCUMENTS

| | | |
|---|---|---|
| DE | 10228946 | 1/2004 |
| EP | 0 035 299 | 9/1983 |
| EP | 0 667 548 | 8/1995 |
| EP | 1 170 618 | 1/2002 |
| EP | 1 197 778 | 4/2002 |
| EP | 1 243 550 | 9/2002 |
| EP | 1 452 481 | 9/2004 |
| EP | 1 484 635 | 12/2004 |
| FR | 2824643 | 10/1999 |
| JP | 06-281956 | 10/1994 |
| JP | 06301054 | 10/1994 |
| JP | 07-45550 | 2/1995 |
| JP | 08293580 | 11/1996 |

| | | |
|---|---|---|
| JP | 09-036387 | 2/1997 |
| JP | 10-116996 | 5/1998 |
| JP | 11-243214 | 9/1999 |
| JP | 11-263012 | 9/1999 |
| JP | 2000-040831 | 2/2000 |
| JP | 2002-277771 | 9/2002 |
| JP | 2002-296521 | 10/2002 |
| JP | 2002-341267 | 11/2002 |
| JP | 2003-021798 | 1/2003 |
| JP | 2003-057571 | 2/2003 |
| JP | 2003-215475 | 7/2003 |
| JP | 2003195201 | 7/2003 |
| JP | 2004157527 | 6/2004 |
| KR | 2002-9270 | 10/1999 |
| RO | 157313 | 5/1991 |
| WO | WO 97/17628 | 5/1997 |
| WO | WO 99/34484 | 7/1999 |
| WO | WO 99/52006 | 10/1999 |
| WO | WO 02/38491 | 5/2002 |
| WO | WO 02/079853 | 10/2002 |
| WO | WO 03/046508 | 6/2003 |
| WO | WO 2004/000717 | 12/2003 |
| WO | WO 2004/015741 | 2/2004 |

OTHER PUBLICATIONS

Lee et al., "Improvement of the surface characteristics of sputtered metal layer for a MEMS micro-mirror switch," Thin Solid Films, vol. 447, Jan. 30, 2004, pp. 615-618.
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.
Chu, et al. "Formation and Microstructures of Anodic Aluminoa Films from Aluminum Sputtered onglass Substrate" Journal of the Electrochemical Society, 149 (7) B321-B327 (2002).
Crouse, "Self-ordered pore structure of anodized aluminum on silicon and pattern transfer" Applied Physics Letters, vol. 76, No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 Jun. 1996 IOP Publishing.
Furneaux, et al. "The Formation of Controlled-porosity membranes from Anodically Oxidized Aluminium" Nature vo 337 Jan. 12, 1989, pp. 147-149.
Goossen et al., "Possible Display Applications of the Silicon Mechanical Anti-Reflection Switch," Society for Information Display (1994).
Joannopoulos et al., "Photonic Crystals: Molding the Flow of Light," Princeton University Press (1995).
Kim et al., "Control of Optical Transmission Through Metals Perforated With Subwavelength Hole Arrays," Optic Letters, vol. 24, No. 4, pp. 256-258 (Feb. 1999).
Magel, "Integrated Optic Devices Using Micromachined Metal Membranes," SPIE vol. 2686, 0-8194-2060-Mar. 1996.
ISR for PCT/US05/030927 filed Aug. 30, 2005.
Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.
Fork, et al., "P-67: Chip on Glass Bonding using StressedMetal™ Technology" Sid 05 Digest, May 24, 2005.
Hall, Integrated optical inteferometric detection method for micromachined capacitiive acoustic transducers, App. Phy. Let. 80:20(3859-3961) May 20, 2002.
Kawamura et al., Fabrication of fine metal microstructures packaged in the bonded glass substrates, Proceedings of SPIE, vol. 3893, pp. 486-493, 1999.
Matsumoto et al., Novel prevention method of stiction using silicon anodization for SOI structure, Sensors and Actuators, 72:2(153-159) Jan. 19, 1999.
Watanabe et al., Reduction of microtrenching and island formation in oxide plasma etching by employing electron beam charge neutralization, Applied Physics Letters, 79:17(2698-2700), Oct. 22, 2001.
Office Action dated Apr. 20, 2007 in U.S. Appl. No. 11/197,885.
Office Action dated Nov. 3, 2006 in U.S. Appl. No. 11/197,885.
Office Action dated Jul. 3, 2006 in U.S. Appl. No. 11/197,885.
IPRP for PCT/US05/030927 filed Aug. 30, 2005.

* cited by examiner

|  | Column Output Signals | |
|---|---|---|
|  | $+V_{bias}$ | $-V_{bias}$ |
| 0 | Stable | Stable |
| $+\Delta V$ | Relax | Actuate |
| $-\Delta V$ | Actuate | Relax |

Row Output Signals

DEVICE AND METHOD FOR MODIFYING ACTUATION VOLTAGE THRESHOLDS OF A DEFORMABLE MEMBRANE IN AN INTERFEROMETRIC MODULATOR

CROSS-REFERENCE TO RELATED APPLICATIONS

This application is a divisional of U.S. application Ser. No. 11/197,885, filed Aug. 5, 2005, which claims the priority benefit under 35 U.S.C. §119(e) of U.S. Provisional Application No. 60/613,451, filed Sep. 27, 2004.

This application is related to U.S. patent application Ser. No. 10/251,196, filed Sep. 20, 2002; and U.S. patent application Ser. No. 11/090,911, filed Mar. 25, 2005.

BACKGROUND

1. Field of the Invention

This invention relates to microelectromechanical systems (MEMS) and, more particularly, to devices and methods for selectively creating constructive and/or destructive interference of light waves.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

In accordance with one aspect of the invention, a microelectromechanical system is provided. The microelectromechanical system comprises a conductor layer, a mechanical layer and a charged layer. The mechanical layer is separated by a cavity from the conductor layer and is configured to move relative to the conductor layer. The charged layer comprises an incorporated charged species and is disposed between the conductor layer and the mechanical layer.

In accordance with another aspect of the invention, a method is provided for modulating electromagnetic radiation. The method comprises providing a plurality of micromechanical devices. Each device comprises a conductor layer, a reflective layer and a charged layer between the conductor layer and the reflective layer. The charged layer has an incorporated charged species. The reflective layer is parallel to and spaced a distance from the conductor layer while in a relaxed state. The distance for some of the micromechanical devices is different from other of the micromechanical devices. The reflective layer is configured to move relative to the conductor layer upon being switched to an actuated state. A voltage is applied to the conductor layers and the reflective layers of the micromechanical devices to actuate the micromechanical devices.

In accordance with yet another aspect of the invention, a method is provided for fabricating a micromechanical device. The method comprises forming a first conductive layer, forming a dielectric layer over the first conductive layer, adding charge to the dielectric layer and forming a second conductive layer over the dielectric layer. In another aspect, the invention provides a micromechanical device formed by this method.

In accordance with another aspect of the invention, an interferometric modulator is provided. The modulator comprises a conductor layer, a movable layer and a means for modifying a voltage actuation threshold of the movable layer with charged species.

DETAILED DESCRIPTION OF PREFERRED EMBODIMENTS

Figure 1:
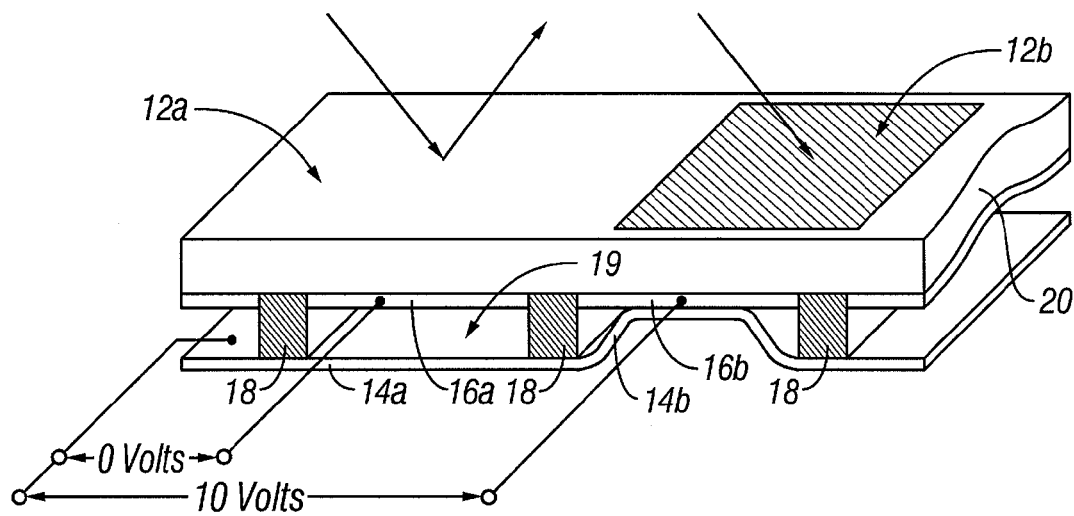
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

As discussed in greater detail below, interferometric modulators can be switched between a bright and a dark state by moving a reflective part (the "reflective layer") relative to a partly-transmissive and partly-reflective part (the "optical stack"), which is spaced from the reflective layer. The movement is actuated by creating electrostatic attraction between the two parts, which causes at least one of the parts to move relative to the other part. In an actuated position, one of the parts has a net positive charge, while the other part has a net negative charge, thereby causing the parts to be drawn close together. In a relaxed position, the net charge between the parts is not sufficient to overcome the mechanical resistance of the parts to movement, and the parts are spaced relatively far apart. The voltage needed to generate sufficient electrostatic attraction to draw the parts into the actuated position may be referred to as the actuation voltage.

According to some preferred embodiments, the actuation voltage can be altered by incorporating positively and/or negatively charged species, such as ions, into the reflective layer and/or the optical stack. The reflective layer and/or the optical stack are preferably provided with a dielectric layer, situated between the reflective layer and the optical stack, into which the charged species can be embedded. The charged species create a constant, baseline level of charge, which augment and/or cancel part of the electrostatic attraction that is generated when applying a voltage to the optical stack and the reflective layer. As a result, a higher or lower actuation voltage may be needed to generate the net level of electrostatic attraction necessary to, e.g., cause the reflective layer to move to an actuated position. For example, if the reflective layer and the optical stack are wired so as to have a positive and a negative charge, respectively, then the actuation voltage can be increased by implanting positively charged ions, which can repel the positively charged reflective layer. Conversely, the actuation voltage can be decreased by implanting negatively charged ions, which help to attract the positively charged reflective layer. Thus, the incorporation of the charged species can be used to alter the actuation voltage as desired.

It will also be appreciated that, as discussed further below, the interferometric modulators exhibit a hysteresis behavior in which they remain in a particular state over a range of applied voltages. This range of applied voltages is referred to as the "hysteresis window." For example, the interferometric modulator remains stable in the relaxed position until the applied voltage is increased to the actuation voltage, when it switches to the actuated position. The interferometric modulator then remains stable in the actuated state until the applied voltage drops below a certain voltage. Pre-charging, e.g., by ion implantation preferably leaves the hysteresis window substantially unchanged and shifts the window with the actuation voltage. Advantageously, this shifting allows the windows to be centered as desired, allowing for the simplification of driver and control systems, as discussed below.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12, which may be referred to separately as 12a and 12b. The interferometric modulators 12 each include a movable mechanical layer 14, which is preferably reflective, and an optical stack 16, which may be referred to separately as movable reflective layers 14a and 14b and optical stacks 16a and 16b. In the interferometric modulator 12a on the left, the movable reflective layer 14a is illustrated in a relaxed position at a predetermined distance from the optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material, such as aluminum, may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, in the actuated position, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
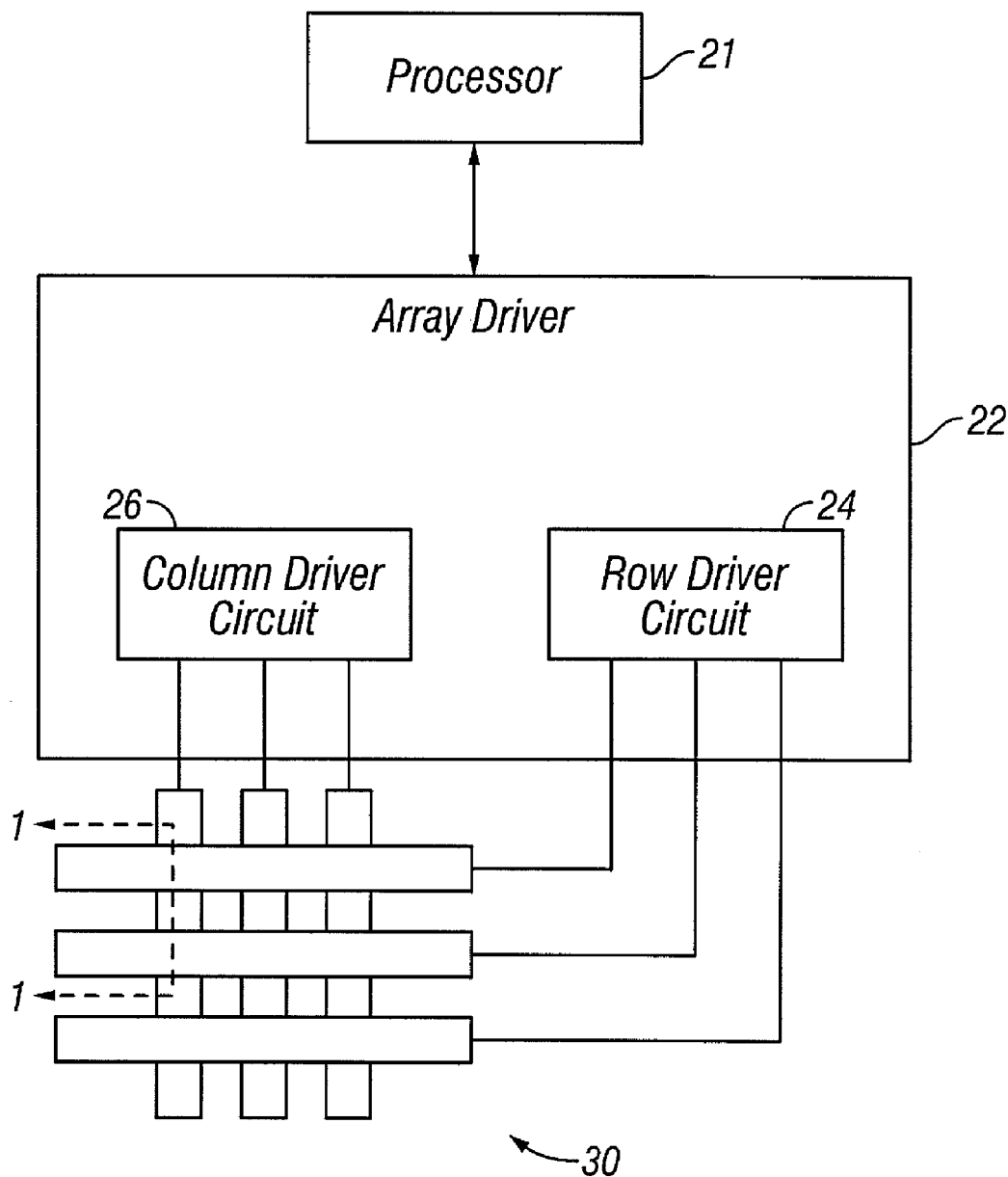
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
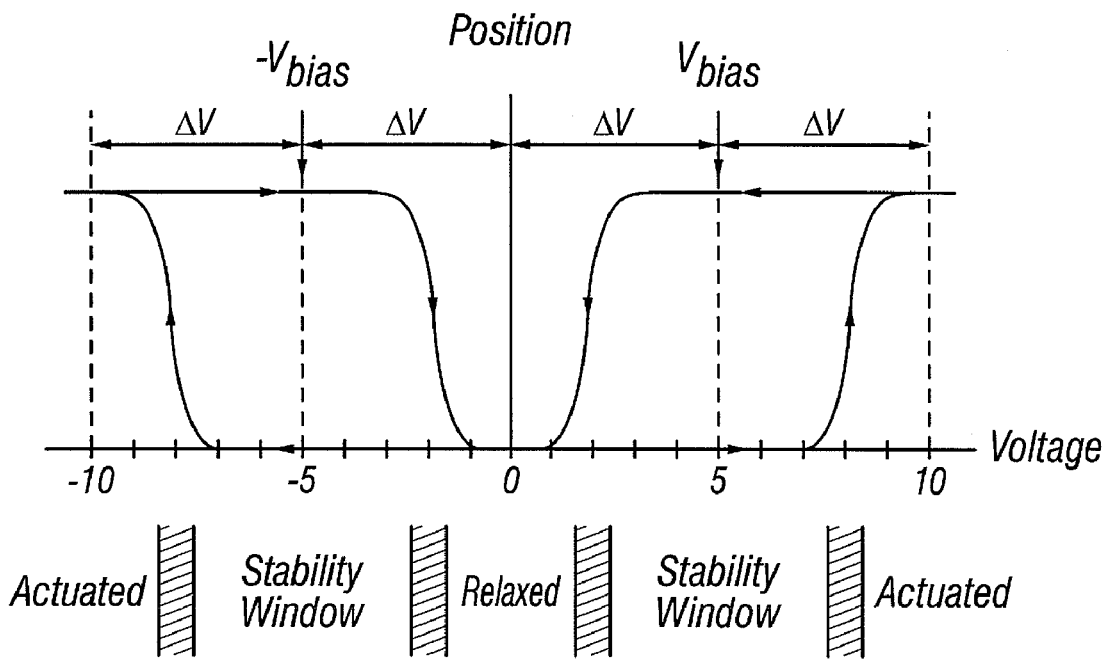
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
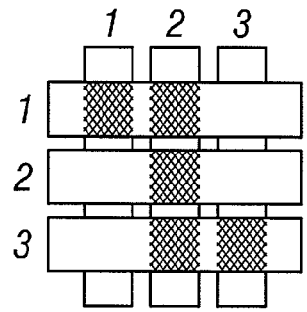
FIGS. 5A and 5B illustrate one exemplary timing diagram for row and column signals that may be used to write a frame of display data to the 3×3 interferometric modulator display of FIG. 2.
Figure 5B:
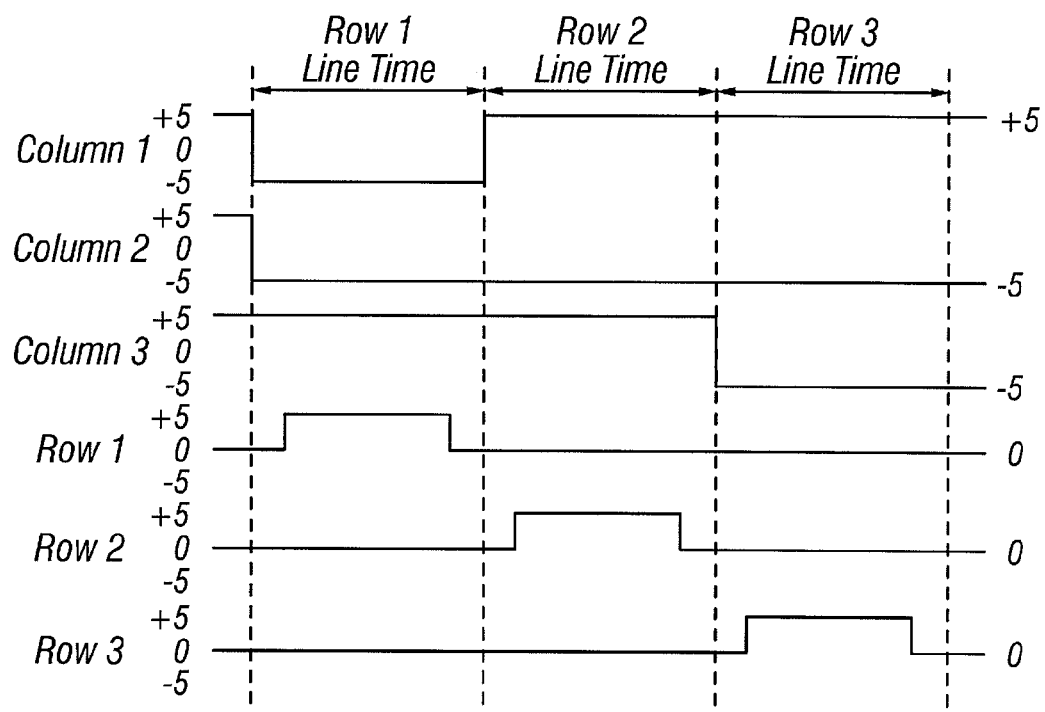

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
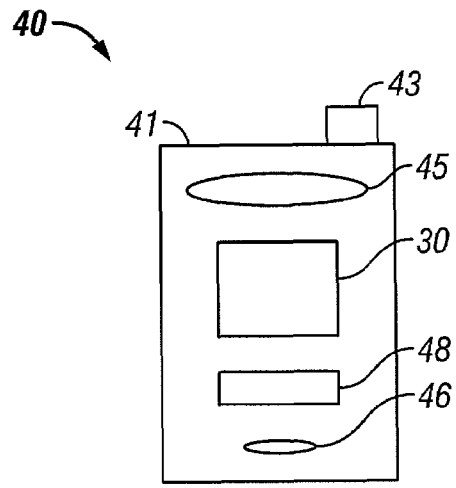
FIGS. 6A and 6B are system block diagrams illustrating an embodiment of a visual display device comprising a plurality of interferometric modulators.
Figure 6B:
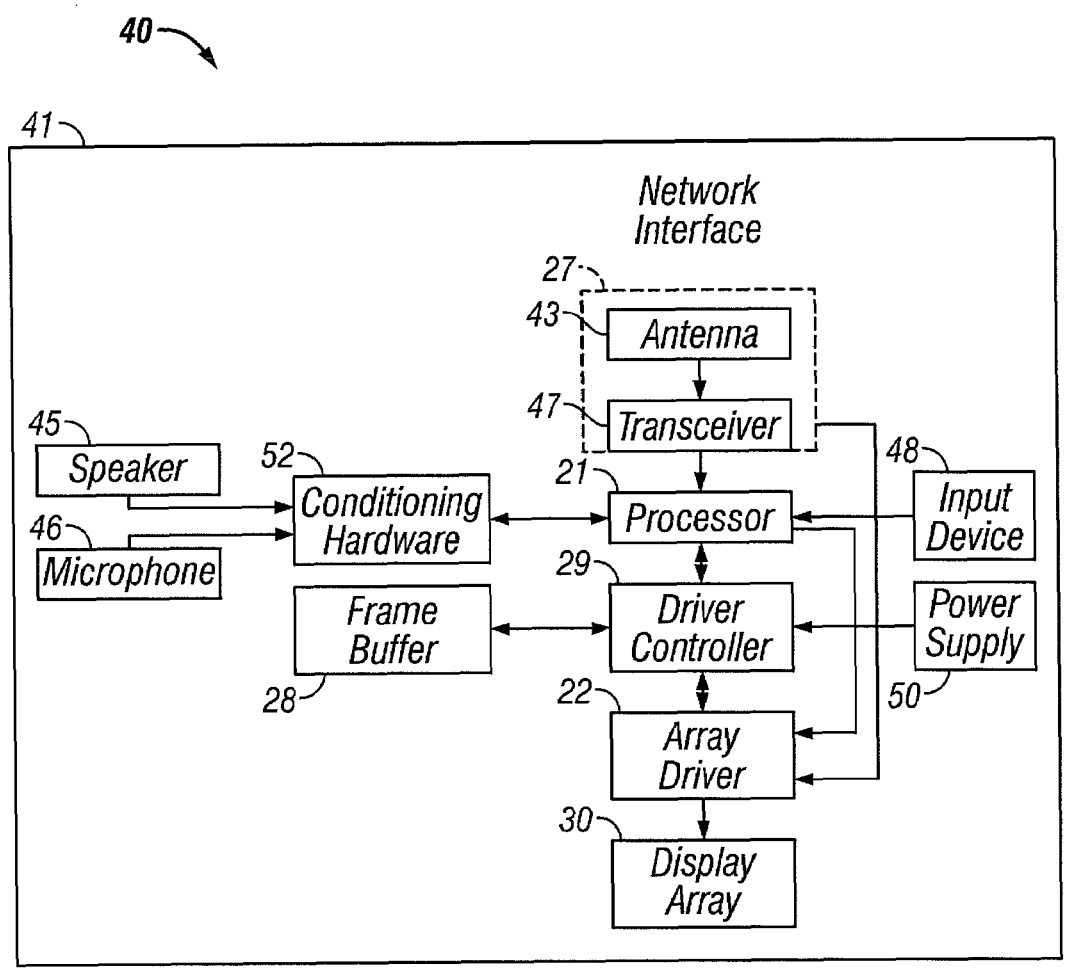

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, a microphone 46, and an input device 48. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
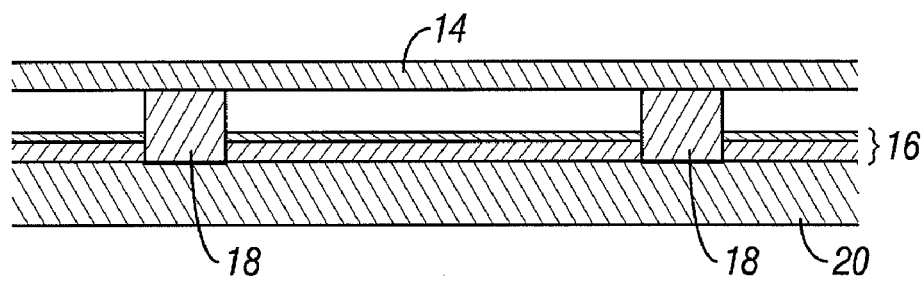
FIG. 7A is a cross section of the device of FIG. 1.
Figure 7B:
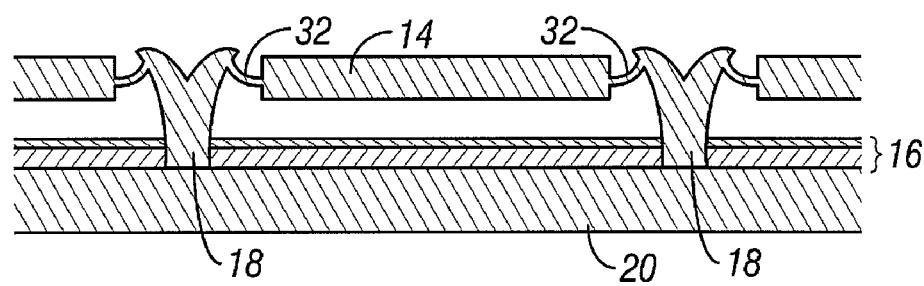
FIG. 7B is a cross section of an alternative embodiment of an interferometric modulator.
Figure 7C:
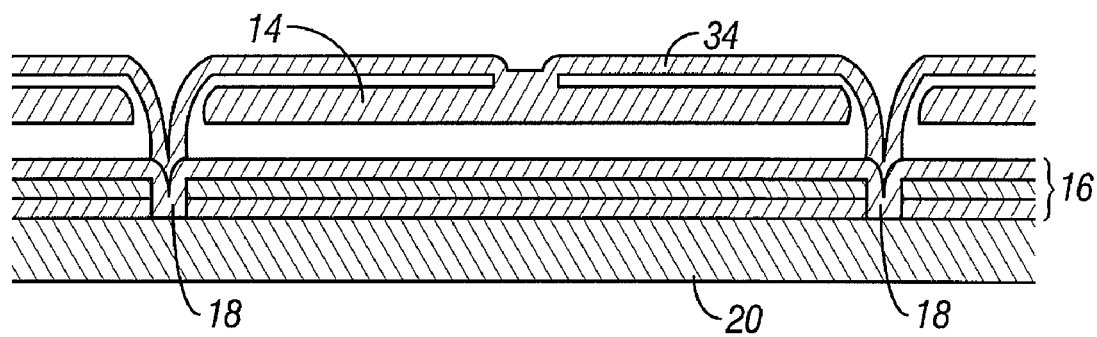
FIG. 7C is a cross section of another alternative embodiment of an interferometric modulator.
Figure 7D:
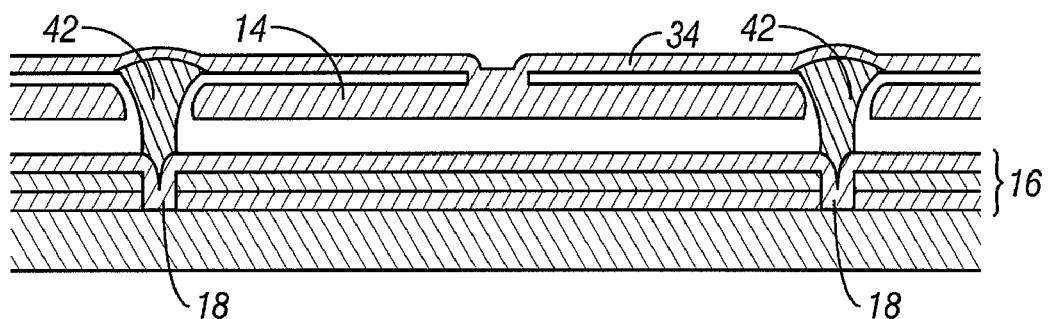
FIG. 7D is a cross section of yet another alternative embodiment of an interferometric modulator.
Figure 7E:
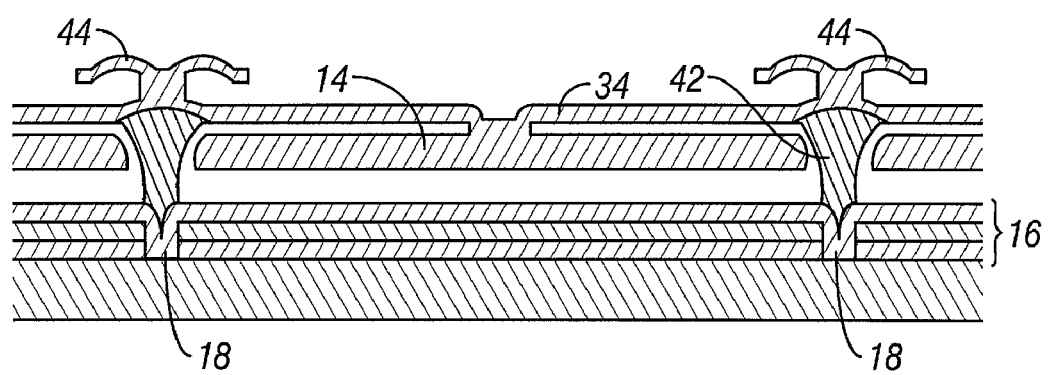
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports 18 at the corners only, on tethers 32. In FIG. 7C, the functions of movement and reflectivity are separated. The moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts 18. The deformable layer 34 constitutes the mechanical layer and the layer 14 is the reflective surface. In the embodiment illustrated in FIG. 7D the support posts 18 include support post plugs 42 upon which the deformable layer 34 rests. The movable reflective layer 14 remains suspended over the cavity, as in FIGS. 7A-7C, but unlike FIG. 7B-7C, the deposition of the deformable layer 34 does not form the support posts by filling holes between the deformable layer 34 and the optical stack 16. Rather, the support posts 18 are at least partially formed of a separately deposited planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged (i.e., viewed from the substrate side). In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
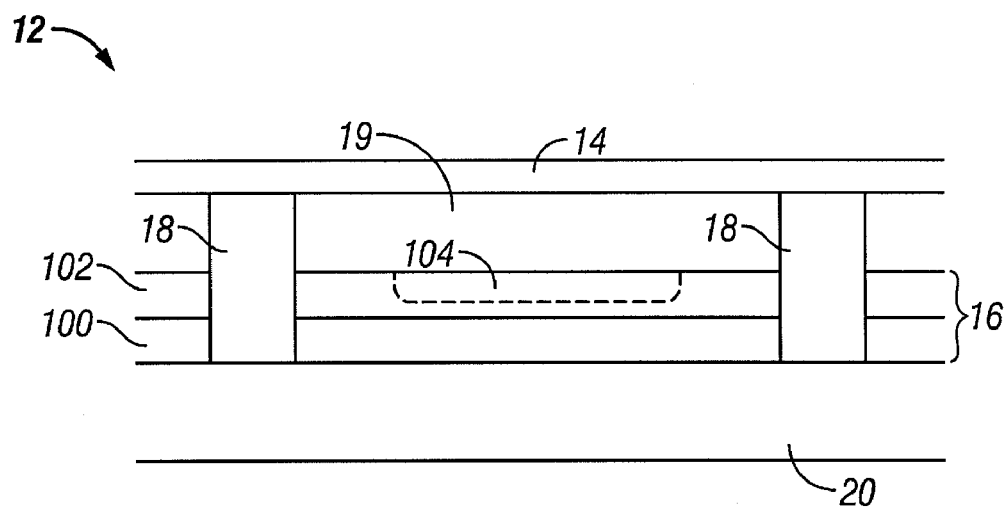
FIG. 8 is a cross section of an interferometric modulator having an incorporated charged species.

With reference to FIG. 8, a cross section of the interferometric modulator 12 is shown in an isolated view. In the exemplary illustrated embodiment, a conductor layer 100, having a fixed position, is deposited onto the glass substrate 20. As noted above, the fixed conductor layer 100 is preferably partially reflective and transparent to desired wavelengths of light, and can be made from, e.g., layers of ITO and chromium. A dielectric layer 102 is deposited onto conductor layer 100. The dielectric layer 102 can comprise silicon oxide, although other dielectric materials, such as aluminum oxide, known in the art are equally applicable. For example, the layer 102 can comprise charge trapping materials, and particularly materials that trap both positive and negative charges, e.g., $Al_2O_3$, $AlO_x$ (non-stoichiometric aluminum oxide), $Si_3N_4$, $SiN_x$ (non-stoichiometric silicon nitride), $Ta_2O_5$ and $TaO_x$ (non-stoichiometric tantalum oxide). The fixed conductor layer 100 and the dielectric layer 102 form the optical stack 16.

Support posts 18 are provided to support the movable, reflective layer, or mechanical/mirror element, 14 a predetermined distance (in the relaxed mode) above the dielectric layer 102. The support posts 18 are preferably formed of a stable material with sufficient structural integrity to support the movable reflective layer 14. For example, the support posts 18 can be fabricated from an organic material, such as photoresist, or from spin-on glass. The movable layer 14 is preferably formed of a flexible, conductive and highly reflective material, for example, a metal such as aluminum, nickel, chromium or combinations or alloys thereof.

With continued reference to FIG. 8, a region 104 within the dielectric layer 102 incorporates a charged species, preferably implanted ions and/or dopants, to alter the optical response of the modulator 12. Ions implanted in the region 104 can be positively charged (p-type) ions or negatively charged (n-type) ions according to the desired effect on the threshold and/or hysteresis properties of the modulator 12. For example, potassium can be used as a positively charged ion and phosphorous can be used as a negatively charged ion. Examples of other positively charged ions, include without limitation, sodium ions and lithium ions.

Figure 9:
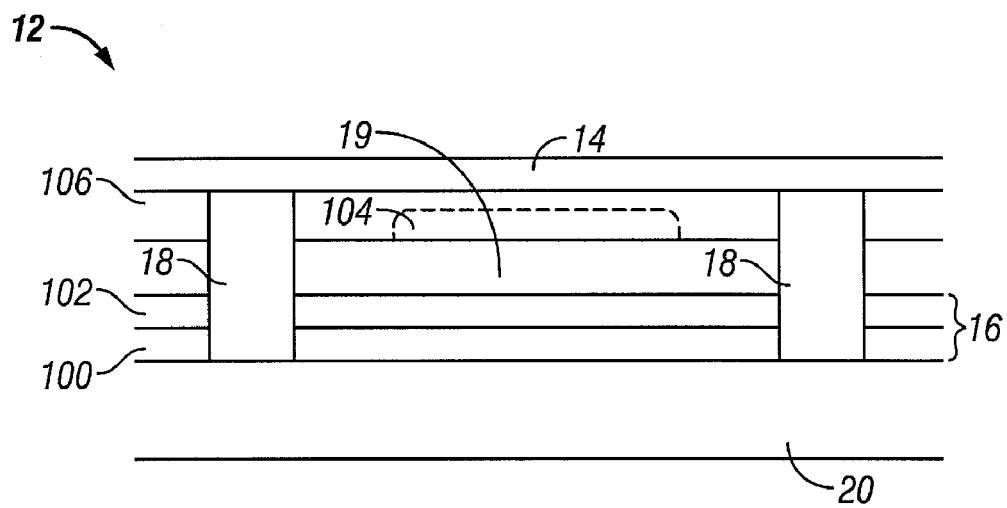
FIG. 9 is a cross section of another interferometric modulator having an incorporated charged species.
Figure 10:
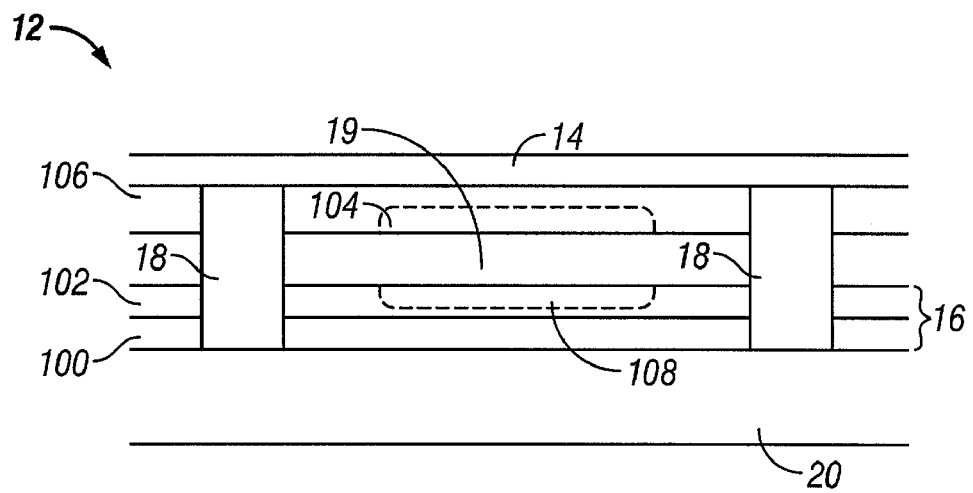
FIG. 10 is a cross section of yet another interferometric modulator having an incorporated charged species.

It will be appreciated that the ions can be disposed in various other positions in the interferometric modulator 12. To prevent the dissipation of charge from the ions, the ions are preferably embedded within a non-conducting material, such as a dielectric, or are surrounded by or embedded within in a material surrounded by an insulator. FIGS. 9-10 illustrate other non-limiting examples of positions for the ions. With reference to FIG. 9, a dielectric layer 106 can be formed adjacent the movable layer 14 and the ion implanted region 104 can be disposed within that layer 106. In such an arrangement, the dielectric layer 102, which typically serves to space and prevent shorting between the movable layer 14 and the fixed conductive layer 100, can optionally be omitted. Preferably, the dielectric layer 106 is formed of a flexible material that does not significantly impede the movement of the layer 14. As noted above, the dielectric layer 106 can be formed of silicon oxide and aluminum oxide.

With reference to FIG. 10, where two dielectric layers, layers 102 and 106 are provided, both layers can be implanted with ions to form ion implanted regions 104 and 108. Depending on the desired effect, both regions can be implanted with ions of the same polarity or with ions of different polarities. Implantation of both the layers 102 and 106 can increase the effect of the implantation. For example, where regions 104 and 108 are implanted with ions of different polarities, a constant level of attraction can be established between the layers 102 and 106, thereby reducing the actuation voltage in cases where the layers 100 and 14 are wired to have the same polarity as the regions 104 and 108, respectively.

Figure 11:
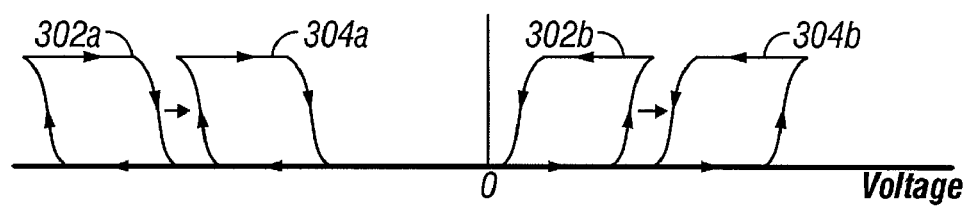
FIGS. 11-12 illustrate the effect of charge incorporation on the hysteresis window of interferometric modulators.
Figure 12:
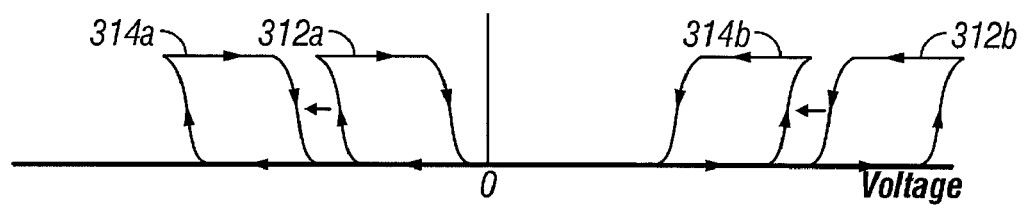
Figure 13:
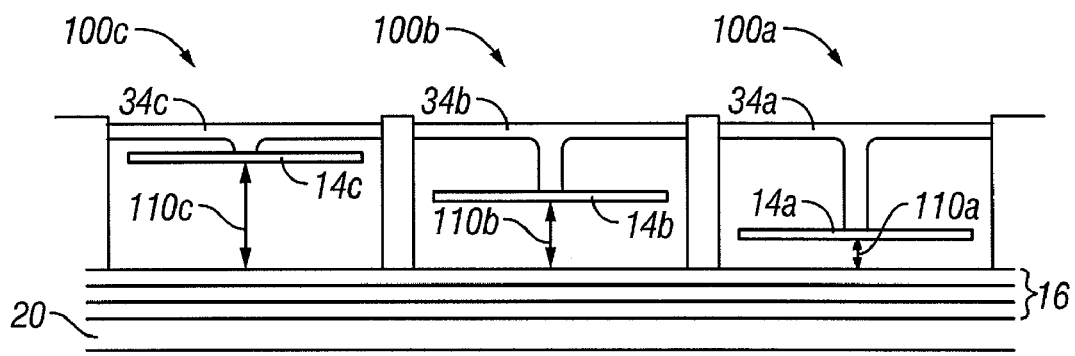
FIG. 13 illustrates a cross section of additional alternative embodiments of interferometric modulators.

Along with changes in the actuation voltage, the introduction of charged ions between the movable layer 14 and the fixed layer 16 can shift the optical response curves of the modulators 12. For example, the optical response curves of FIGS. 11-13 plot the displacement of movable layer 14 against the voltage applied to the movable layer 14 and the fixed layer 16 of the interferometric modulator 12 of FIG. 8. In the positive voltage region of the graph, the movable layer 14 is connected to a voltage source to generate a positive charge in that layer 14 and the fixed conductor layer 100 is connected to the voltage source to generate a negative charge in that layer 100. In the negative voltage region of the graph, the movable layer 14 is connected to a voltage source to generate a negative charge in that layer 14 and the fixed conductor layer 100 is connected to the voltage source to generate a positive charge in that layer 100. At the bottom of the curves, the movable layer 14 is in the relaxed position and, at the top of the curves, the movable layer 14 is in the actuated position.

FIG. 11 illustrates the effect of implanting positively charged or p-type ions into the dielectric layer 102. The introduction of the positively charged ions into the dielectric layer 102 causes the optical response curves to shift to the right. In the positive voltage region, the p-type ions repel the positively charged movable layer 14, thus requiring a larger voltage and greater electrostatic attraction to be applied before the movable layer 14 can be made to collapse. In the negative voltage region, the p-type ions attract the negatively charged movable layer 14, thus requiring a smaller voltage and lesser electrostatic attraction to be applied before the movable layer 14 can be made to collapse. Optical response curves 302a and 302b represent the optical response characteristics for an interferometric modulator without ion implantation. The same interferometric modulator with positively charged ions in the dielectric layer displays optical response characteristics represented by optical response curves 304a and 304b. Because the level of charge introduced by the ions is constant, the ions augment or reduce the net electrostatic attraction by the same amount, so that both the positive and negative response curves will shift to the right by the same amount. The amount of the shift in the optical response characteristics is determined by the total charge of the ions introduced into dielectric layer 102, which may be proportional to the amount of ions implanted.

FIG. 12 illustrates the effect of implanting negatively charged or n-type ions into the dielectric layer 102. The introduction of negatively charged ions into dielectric layer 102 causes the optical response curves to shift to the left. In the positive voltage region, the n-type ions attract the movable layer 14 to the actuated position, while in the negative voltage region, the n-type ions repel the movable layer 14 to maintain that layer in the relaxed position. Optical response curves 312a and 312b represent the optical response characteristics for an interferometric modulator 12 without ion implantation. The same interferometric modulator 12 with negatively charged ions in the dielectric layer displays optical response characteristics represented by the optical response curves 314a and 314b. As in FIG. 11, both the positive and negative response curves shift to the left by the same amount and the amount of the shift in the optical response characteristics is determined by the amount of ions introduced into dielectric layer 102.

It will be appreciated that interferometric modulators can be formed with a hysteresis curve centered away from the zero voltage line. For example, the interferometric modulators can be formed having a particular level of charge between the layers 14 and 16, even without ion implantation. For example, structural defects or structural modifications in the dielectric layer 102 can result in such a charge. As a result of this charge, the hysteresis window for these interferometric modulators may not be centered relative to the zero voltage line. Moreover, different interferometric modulators may exhibit a different level of charge. The charges and the different levels of charges may adversely affect the behavior of the interferometric modulators by reducing predictability and control over the actuation and release of the movable layers of the interferometric modulators. Advantageously, depending upon the charge already present, ion implantation can allow the hysteresis behavior of the interferometric modulators to be re-centered about the zero voltage line by, e.g., neutralizing the already present charge. As a result, predictability and control over the actuation and release of the movable layers of the interferometric modulators can be increased.

While discussed above with reference to incorporated charged species in the dielectric layer 102, it will be appreciated that similar affects can be achieved by incorporation of charged species in the layer 106 (when present, as illustrated in FIG. 9) or incorporation of charged species in both the layers 102 and 106 (when present, as illustrated in FIG. 10). For example, charged species can be incorporated in the layer 106 to achieve the effects illustrated in FIGS. 11 and 12. Where a voltage source is connected to the movable layer 14 and to the fixed layer 16 to generate positive and negative charges in those layers, respectively, incorporation of a negative charged species in the layer 106 will result in the rightward shift of the hysteresis curve illustrated in FIG. 11. Conversely, in a similar arrangement, but with a positive charged species in the layer 106, the hysteresis curve will shift to the left, as shown in FIG. 12.

Moreover, both the layers 102 and 106 can be provided in an interferometric modulator and each can be incorporated with charged species. For example, with the movable layer 14 and the fixed layer 16 again configured to be positively and negatively charged, respectively, an effect similar to that illustrated in FIG. 11 can be achieved by incorporation of a positive charged species in the layer 102 and a negative charged species in the layer 106. In addition, the hysteresis curves can be shifted to the left by incorporation of a negative charged species in the layer 102 and a positive charged species in the layer 106.

It will be appreciated that the effect of the incorporation of the charged species can be reversed by reversing the polarities of the layers 102 and 106. For example, if a certain arrangement of charged species shifts the hysteresis curves to the left when the movable layer 14 and the fixed layer 16 are connected to a voltage source to generate positive and negative charges, respectively, in those layers, the same arrangement of charged species will shift the hysteresis curves to the right if the voltage source is connected to the layers 102 and 106 in reverse, i.e., so that the polarities in those layers is reversed.

With reference to FIG. 13, in some arrangements, interferometric modulators can be formed to generate constructive interference centered at a plurality of different frequencies to generate different perceived colors, e.g., two or more, or three or more different colors. These interferometric modulators can be grouped to form, e.g., the individual red, green and blue picture elements of a display. It will be appreciated that the interference behavior of the interferometric modulators is determined by the spacing between the movable layer 14 and the fixed layer 16. Thus, interferometric modulators 100a, 100b, and 100c may be forming having a different spacing 110a, 110b, 110c between the movable layers 14a, 14b, 14c and the fixed layer 16, thereby allowing each of the different colors to be generated. Because of the different spacing, each interferometric modulator 100a, 100b, and 100c can have a different actuation voltage and hysteresis curve.

Figure 14:
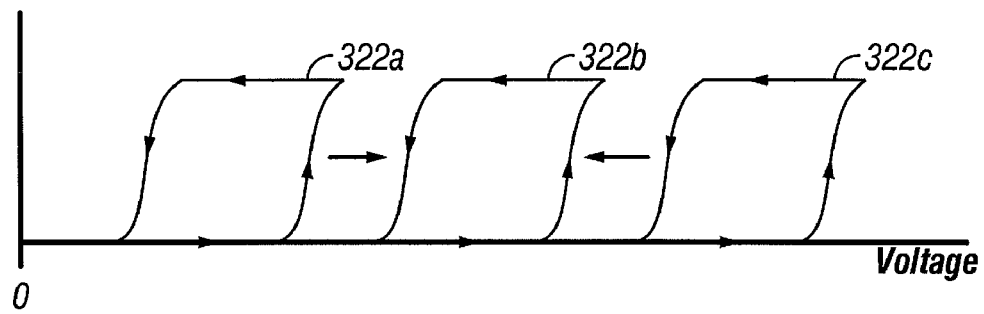
FIG. 14 illustrates the effect of charge incorporation on the hysteresis windows of interferometric modulators of FIG. 13.

Such a situation is illustrated in FIG. 14, which shows the hysteresis curves, 322a, 322b and 322c, for the three interferometric modulators 100a, 100b, 100c, respectively, each having a different spacing designed to give a different color. It will be appreciated that the interferometric modulators in a display can be implanted with different ions and/or with different levels of ions. Advantageously, all or some of the interferometric 100a, 100b, 100c modulators can be implanted with ions to shift the curves 322a-322c so that they overlap. By overlapping the curves, the threshold and release voltages can be made similar, advantageously reducing the number of voltages needed for operating the interferometric modulators and thus simplifying the driver and control systems associated with the interferometric modulators.

For example, in the arrangement shown in FIG. 14, the curve 322b is used as a reference and the interferometric modulators associated with the curves 322a and 322c are implanted with different ions, so that the curve 322a (e.g., with a dielectric layer, between the layer 34a and the conductor layer in the optical stack 16 of the interferometric modulator 100a, implanted with p-type ions) shifts to the right and the curve 322c (e.g., with a dielectric layer, between the layers 34c and the conductor layer in the optical stack 16 of the interferometric modulator 100c, implanted with n-type ions) shifts to the left, thereby allowing both to overlap the curve 322b. As a result, all three curves 322a-322c can advantageously be driven, in the positive voltage region, using the same threshold and release voltages.

Figure 15:
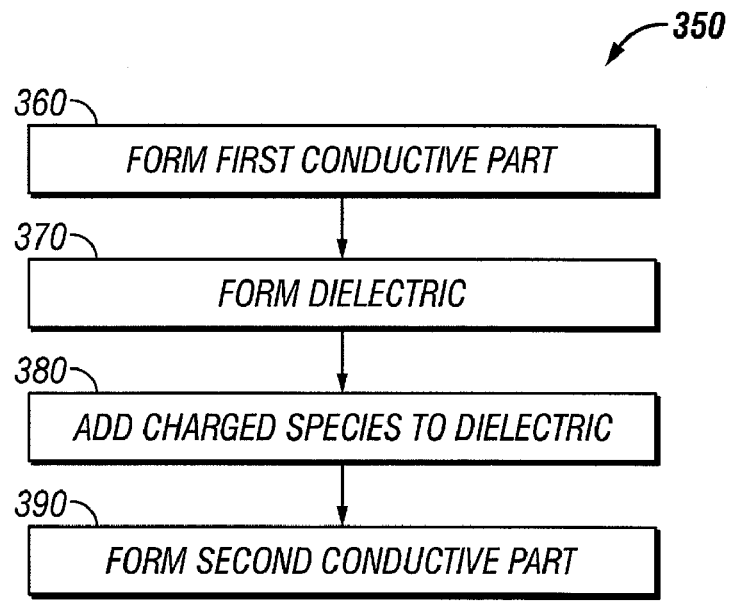
FIGS. 15-16 are flowcharts showing steps in processing sequences for making an interferometric modulator.

With reference to FIG. 15, flowchart 350 illustrates generally steps in the formation of an interferometric modulator 12. A first conductive part is formed 360, e.g., on a substrate, which can be, e.g., glass. A dielectric is formed 370 over the first conductive part and charged species is added 380 into the dielectric layer.

Figure 16:
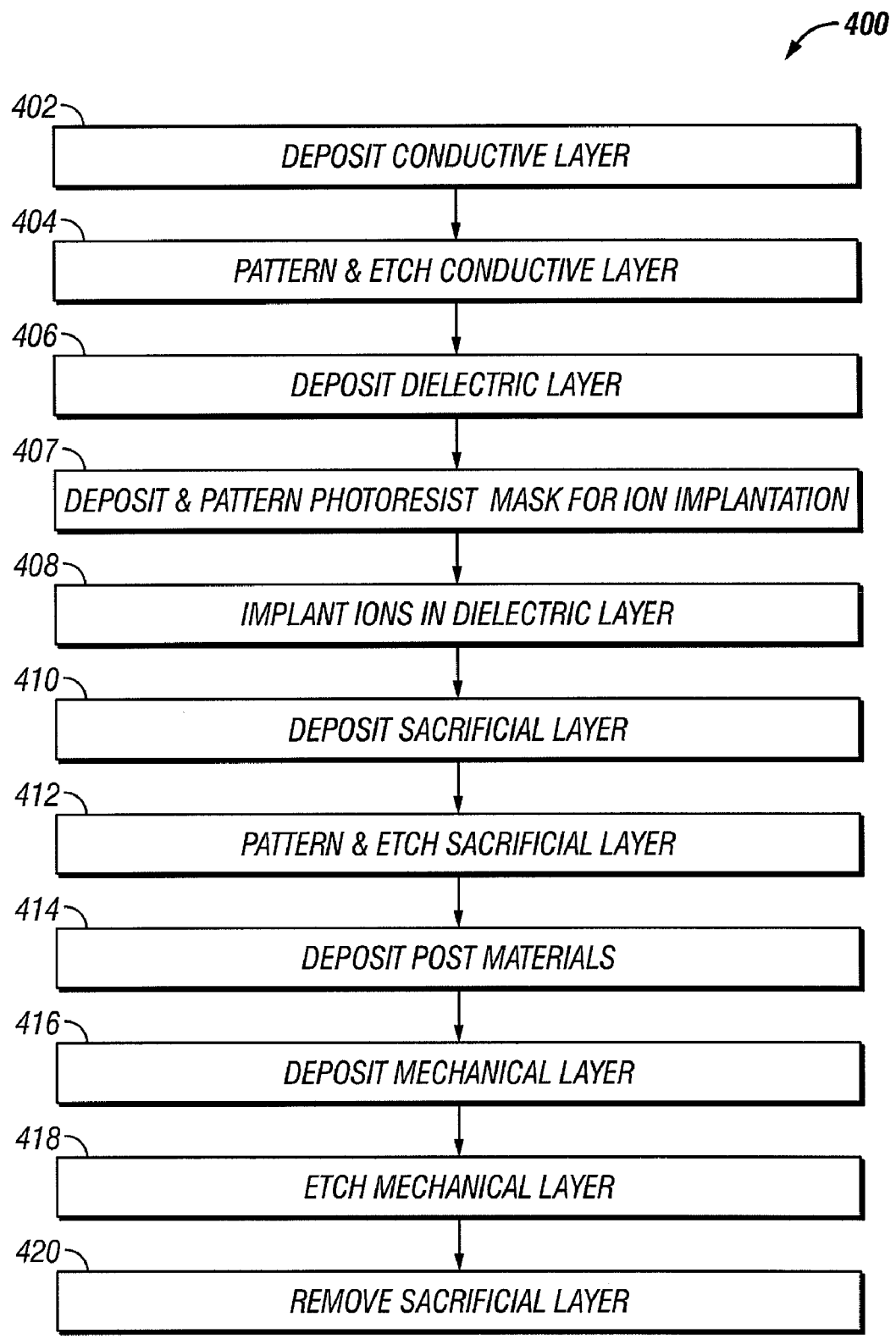

While various process steps are illustrated as separate blocks in FIGS. 15 and 16, it will be appreciated that the separate blocks do not indicate that the steps are necessarily temporally separated. For example, dielectric formation and charge addition can occur simultaneously, so that charged species, e.g., ions, are formed as as-deposited species in the dielectric. An example of a suitable process for simultaneous dielectric formation and charge addition is co-sputtering, in which ionic species and dielectric precursors are simultaneously sputtered on a substrate. In other embodiments, charge addition occurs after the formation of the dielectric. In this case, charge addition can be accomplished by various processes known in the art. In some embodiments, the ions can be implanted into the dielectric or can be diffused into the dielectric. For example, the dielectric layer can be doped, e.g., diffusion doped.

With continued reference to FIG. 15, a second conductive part is formed 390 over the ion implanted dielectric. It will be appreciated that the first conductive part can correspond to the one of the conductive layers of the interferometric modulator 12 (FIG. 8), e.g., the fixed conductive layer 16. The second conductive part can correspond to the other illustrated conductive layer of the interferometric modulator 12, e.g., the movable layer 14.

With reference to FIGS. 8 and 16, flowchart 400 describes certain steps of a fabrication sequence used to make the exemplary interferometric modulator 12 illustrated in FIG. 8. The conductor layer 100, typically comprising ITO and chromium, is deposited 402 onto the substrate 20. The conductor layer 100 is patterned and etched 404 to form rows of the interferometric modulators 12. The dielectric layer 102 is deposited 406 on conductor layer 100. This dielectric layer 102 can be formed of $SiO_2$, although other dielectrics compatible with the other materials and process steps for forming the interferometric modulator 12 can be used. A layer of photoresist is deposited and patterned 407 to provide a mask shielding some areas of the dielectric layer 102 and having openings allowing for implantation in desired areas of the dielectric 102. The charged ions are implanted through the patterned photoresist and into the dielectric layer 102, thereby forming the implanted regions 104 of the dielectric layers 102. The charge of the implanted ions and the degree of the implantation is selected in accordance with the desired effect on optical response characteristics, as described above. For example, the polarity of the ions can be chosen based upon the direction in which a shift in a hysteresis curve (FIG. 11-13) is desired and the degree of the implantation can be chosen based upon the magnitude of the desired shift.

It will be appreciated that the ion implantation can disrupt the structure of the dielectric. As a result, the ion implantation can be followed by an anneal to reorient the dielectric structure, to improve the optical characteristics of the implanted dielectric and to more evenly distribute the ions within the dielectric.

It will be appreciated that, in some embodiments, no photoresist is needed and the step 407 can be omitted if all interferometric modulators 12 are to be uniformly implanted with the same ion or ions. In other embodiments, the patterned photoresist allows interferometric modulators 12 to be selectively implanted with ions, thereby allowing different ions to be implanted or different levels of implantation to be achieved. It will be appreciated that multiple photoresist depositions and/or patterning steps can be used to selectively implant a plurality of different ions or to selectively implant different quantities of ions. For example, the photoresist can be deposited and patterned to implant ions in some particular interferometric modulators 12, additional photoresist can be deposited and patterned to implant ions in other interferometric modulators 12, and so on. After the ion implantation, the photoresist is preferably removed.

Moreover, the charge incorporation can occur at a later step than that illustrated. For example, the ion implantation can be performed after deposition 410 of a non-metal sacrificial layer (e.g., silicon), discussed below, and preferably before the formation of additional metal layers.

In step 410, a sacrificial layer (which will later be removed to form the optical cavity of the interferometric modulator 12) is deposited. The sacrificial layer is formed of a solid material that can later be removed, e.g., by etching, without disrupting the other materials of the interferometric modulator 12. An example of a preferred material for the sacrificial layer is molybdenum. Other suitable sacrificial materials include silicon and tungsten, which advantageously can also be selectively or preferentially removed using $XeF_2$ without etching aluminum or silicon oxide. The sacrificial layer is patterned and etched 412 to provide voids into which materials to form the support posts 18 will be deposited. In step 414, the post material is deposited, thereby forming the support posts 18. The post material can be, e.g., photoresist or some other organic compound or spin on glass. In step 416, a mechanical/mirror film is deposited. As noted above, the film can be made of, e.g., aluminum or other flexible metals. In step 418, the mechanical film is patterned and etched to form the mechanical/mirror layer 14. The sacrificial layer is then removed 420.

Interferometric modulators according to the preferred embodiments offer numerous advantages. For example, charge incorporation allows the actuation voltage and/or hysteresis curve for a particular interferometric modulator to be shifted as desired. As a result, it is possible to reduce the voltages required to drive the interferometric modulators, thereby lowering the power requirements and power consumption of displayers utilizing the interferometric modulators. In addition, hysteresis curves can be shifted by charge incorporation to center the curves about the zero voltage line. This can be achieved, for example, by neutralizing charges that may form in the dielectric layer of between the conductive layers of the interferometric modulators. Centering the hysteresis curves can make control over the states of the interferometric modulators more predictable, e.g., by setting the actuation voltages at expected values. Moreover, in cases in which multiple interferometric modulators, each naturally having a different actuation voltage and shifted hysteresis curves, are present, some or all of the interferometric modulators can be doped so that the hysteresis curves substantially overlap. As a result, the actuation voltages and the release voltages of each of the interferometric modulators overlap, thereby reducing the number of different voltages that is generated to control the interferometric modulators. Thus, the driver and control systems can be simplified.

While the charged species are discussed above as "implanted ions," it will be appreciated that the charged species can be any charged species incorporated in a material disposed between the movable conductive layer and the fixed conductive layer. In other embodiments, the charged species can simply be deposited on a dielectric substrate and preferably has a charge as deposited. The dielectric layer, while preferably disposed on a conductive layer for simplicity of fabrication and structure, can be spaced from the conductive layers. Moreover, while discussed as having one movable and one fixed conductive layer for ease of description and illustration, in some embodiments, the positions of the movable and fixed layers can be reversed from that illustrated, or both layers can be made to move.

Accordingly, it will be appreciated by those skilled in the art that various other omissions, additions and modifications may be made to the methods and structures described above without departing from the scope of the invention. All such modifications and changes are intended to fall within the scope of the invention, as defined by the appended claims.

I claim:

1. A method for fabricating an interferometric light modulating device, comprising:
   forming a conductive reflective layer;
   forming a dielectric layer over the reflective layer;
   adding a charged species to the dielectric layer; and
   subsequently forming a conductive partly-transmissive and partly-reflective layer over the dielectric layer.

2. A method for fabricating an interferometric light modulating device, comprising:
   forming a conductive reflective layer;
   forming a dielectric layer over the reflective layer;
   adding a charged species to the dielectric layer, wherein adding the charged species comprises performing an ion implantation after forming the dielectric layer; and
   forming a conductive partly-transmissive and partly-reflective layer over the dielectric layer.

3. The method of claim 2, further comprising annealing the dielectric layer after adding the charged species.

4. The method of claim 1, wherein adding charge comprises directing ions to the dielectric as the dielectric is formed.

5. The method of claim 4, wherein adding the charged species comprises simultaneously sputtering an ion precursor and one or more dielectric precursors.

6. A method for fabricating an interferometric light modulating device, comprising:
   forming a conductive reflective layer;
   forming a dielectric layer over the reflective layer;
   adding a charged species to the dielectric layer, wherein adding the charged species comprises doping the dielectric layer; and
   forming a conductive partly-transmissive and partly-reflective layer over the dielectric layer.

7. The method of claim 6, wherein doping the dielectric layer comprises diffusing dopants into the dielectrtic layer.

8. The method of claim 6, wherein the charge is provided by implanting ions chosen from the group consisting of potassium and phosphorous ions.

9. The method of claim 6, wherein the charge is provided by implanting ions chosen from the group consisting of sodium ions and lithium ions.

10. The method of claim 1, wherein forming the reflective layer comprises depositing a layer of chromium and/or indium-tin-oxide.

11. A method for fabricating an interferometric light modulating device, comprising:
- forming a conductive reflective layer;
- forming a dielectric layer over the reflective layer, wherein forming the dielectric layer comprises depositing an oxide;
- adding a charged species to the dielectric layer; and
- forming a conductive partly-transmissive and partly-reflective layer over the dielectric layer.

12. The method of claim 11, wherein the oxide is chosen from the group consisting of aluminum oxide and/or silicon oxide.

13. The method of claim 11, further comprising depositing a layer of a sacrificial material over the dielectric layer and subsequently forming the partly-transmissive and partly-reflective layer.

14. The method of claim 13, wherein forming the partly-transmissive and partly-reflective layer comprises depositing a metallic layer over the sacrificial material.

15. The method of claim 14, further comprising preferentially removing the sacrificial material.

* * * * *

UNITED STATES PATENT AND TRADEMARK OFFICE
CERTIFICATE OF CORRECTION

PATENT NO. : 7,660,031 B2  Page 1 of 1
APPLICATION NO. : 12/027862
DATED : February 9, 2010
INVENTOR(S) : Philip D. Floyd It is certified that error appears in the above-identified patent and that said Letters Patent is hereby corrected as shown below:

On the title page, item [56]:

Col. 1, line 35, under "Other Publications," please change "Aluminoa" to --Alumina--.

Col. 1, line 36, under "Other Publications," please change "onglass" to --on glass--.

Col. 2, line 2, under "Other Publications," please change "compatable" to --compatible--.

Col. 2, line 6, under "Other Publications," please change "vo" to --vol.--.

Col. 2, line 25, under "Other Publications," please change "inteferometric" to --interferometric--.

Col. 2, line 26, under "Other Publications," please change "capacitiive" to --capacitive--.

Col. 14, line 59, please change "(FIG." to --(FIGS.--.

Col. 16, line 58 (approximately), Claim 7, please change "dielectrtic" to --dielectric--.

Signed and Sealed this

Seventeenth Day of August, 2010

David J. Kappos
*Director of the United States Patent and Trademark Office*